United States Patent
Johns et al.

(10) Patent No.: US 8,226,126 B2
(45) Date of Patent: Jul. 24, 2012

(54) BOTTLE MIXING ASSEMBLY

(75) Inventors: Garry Patrick Johns, Oceanside, CA (US); Corey Neil Johns, Oceanside, CA (US); Timothy Henry Kuitems, Orange, CA (US)

(73) Assignee: JPro Dairy International, Inc., Oceanside, CA (US)

( * ) Notice: Subject to any disclaimer, the term of this patent is extended or adjusted under 35 U.S.C. 154(b) by 432 days.

(21) Appl. No.: 12/546,535

(22) Filed: Aug. 24, 2009

(65) Prior Publication Data

US 2011/0042944 A1    Feb. 24, 2011

(51) Int. Cl.
*F16L 35/00* (2006.01)
(52) U.S. Cl. .......................... 285/3; 206/222
(58) Field of Classification Search .............. 285/3, 4; 215/DIG. 8, 227; 222/83; 206/222
See application file for complete search history.

(56) References Cited

U.S. PATENT DOCUMENTS

| | | | |
|---|---|---|---|
| 2,631,521 A | | 3/1953 | Atkins |
| 2,784,949 A | | 3/1957 | Dennon |
| 2,876,113 A | | 3/1959 | Barton |
| 3,201,148 A | * | 8/1965 | Shurtleff ............................ 285/3 |
| 3,285,627 A | * | 11/1966 | Kozulla et al. ..................... 285/3 |
| 3,404,811 A | | 10/1968 | Cernel |
| 3,476,411 A | * | 11/1969 | Herbert et al. ................. 285/192 |
| 3,900,223 A | * | 8/1975 | Schafer et al. ..................... 285/4 |
| 4,140,337 A | * | 2/1979 | Arcella et al. ..................... 285/3 |
| 4,266,813 A | | 5/1981 | Oliver |
| 4,465,183 A | | 8/1984 | Saito et al. |
| 4,508,367 A | * | 4/1985 | Oreopoulos et al. .............. 285/3 |
| 4,614,437 A | * | 9/1986 | Buehler ......................... 366/130 |
| 4,757,916 A | | 7/1988 | Goncalves |
| 4,982,875 A | | 1/1991 | Pozzi et al. |
| 4,986,322 A | | 1/1991 | Chibret et al. |
| 5,000,314 A | | 3/1991 | Fuller et al. |
| 5,186,323 A | | 2/1993 | Pfleger |
| 5,209,565 A | | 5/1993 | Goncalves |

(Continued)

FOREIGN PATENT DOCUMENTS

EP        0 692 235 A1    1/1996

(Continued)

OTHER PUBLICATIONS

Notification of Transmittal of the International Search Report and the Written Opinion of the International Searching Authority, or Declaration (Mailing Date: Oct. 7, 2010) for International Patent Application No. PCT/US10/46375, Filed on Aug. 23, 2010.

(Continued)

*Primary Examiner* — Aaron Dunwoody
(74) *Attorney, Agent, or Firm* — Vic Y. Lin; Innovation Capital Law Group, LLP

(57) ABSTRACT

A mixing assembly includes a coupler with a temporary seal that is connected to a first container containing mix ingredients. An internally and externally threaded insert is threadedly mated with the internally threaded coupler in an initial position short of breaching the temporary seal. A second container is screwed into the internally threaded insert. Sealing relationships are formed between the coupler and the insert, and between the insert and the received second container. Once the second container is secured to the insert, the coupler is screwed downwardly toward the insert to cause the insert to threadedly advance toward and eventually breach the temporary seal to enable contents of the first container to mix with that of the second container.

20 Claims, 7 Drawing Sheets

U.S. PATENT DOCUMENTS

| | | | |
|---|---|---|---|
| 5,277,303 | A | 1/1994 | Goyet et al. |
| 5,297,696 | A | 3/1994 | Bernstein et al. |
| 5,353,928 | A | 10/1994 | Schumacher |
| 5,366,114 | A | 11/1994 | Bernstein et al. |
| 5,465,835 | A * | 11/1995 | Schumacher et al. ........ 206/221 |
| 5,525,299 | A | 6/1996 | Lowe |
| 5,735,320 | A | 4/1998 | Tune et al. |
| 5,743,423 | A | 4/1998 | Franco |
| 5,782,345 | A | 7/1998 | Guasch et al. |
| 5,927,549 | A | 7/1999 | Wood |
| 5,941,380 | A | 8/1999 | Rothman |
| 5,984,141 | A | 11/1999 | Gibler |
| 6,045,254 | A | 4/2000 | Inbar et al. |
| 6,089,389 | A | 7/2000 | Sharon et al. |
| 6,135,275 | A | 10/2000 | Kelders et al. |
| 6,237,649 | B1 | 5/2001 | Moisio et al. |
| 6,244,433 | B1 | 6/2001 | Vieu |
| 6,321,908 | B1 | 11/2001 | Lorscheidt |
| 6,390,342 | B1 | 5/2002 | Mabee |
| 6,394,992 | B1 * | 5/2002 | Sjoholm ....................... 604/411 |
| 6,485,479 | B1 | 11/2002 | Knierbein |
| 6,517,878 | B2 | 2/2003 | Heczko |
| 6,527,109 | B2 | 3/2003 | Schoo et al. |
| 6,527,110 | B2 | 3/2003 | Moscovitz |
| 6,533,113 | B2 | 3/2003 | Moscovitz |
| 6,540,070 | B1 | 4/2003 | Conwell |
| 6,655,524 | B2 | 12/2003 | De Laforcade |
| 6,668,875 | B2 | 12/2003 | Kojima et al. |
| 6,709,424 | B1 | 3/2004 | Knierbein |
| 6,814,229 | B2 | 11/2004 | Seckler |
| 7,066,323 | B1 | 6/2006 | Reisman |
| 7,198,611 | B2 | 4/2007 | Connell et al. |
| 7,308,915 | B2 | 12/2007 | Johns et al. |
| 7,584,842 | B2 * | 9/2009 | Neumeyer et al. ............ 206/222 |
| 7,635,012 | B2 * | 12/2009 | Johns et al. ................... 141/322 |
| 2002/0066677 | A1 * | 6/2002 | Moscovitz .................... 206/219 |
| 2003/0017236 | A1 | 1/2003 | Makita et al. |
| 2006/0157971 | A1 * | 7/2006 | Baldwin et al. ................... 285/3 |
| 2007/0289663 | A1 | 12/2007 | Johns et al. |
| 2007/0289670 | A1 | 12/2007 | Johns et al. |
| 2010/0282624 | A1 * | 11/2010 | Paganuzzi .................... 206/222 |

FOREIGN PATENT DOCUMENTS

| | | |
|---|---|---|
| GB | 2327409 A | 1/1999 |
| JP | 2000313484 | 11/2000 |

OTHER PUBLICATIONS

Notification of Transmittal of the International Search Report and the Written Opinion of the International Searching Authority, or Declaration (Mailing Date: Jun. 25, 2008) for International Patent Application No. PCT/US2007/11933, Filed on May 17, 2007.

Notification of Transmittal of the International Search Report and the Written Opinion of the International Searching Authority, or Declaration (Mailing Date: Dec. 20, 2007) for International Patent Application No. PCT/US2007/11936, Filed on May 17, 2007.

European Patent Office Examiner's Report dated Nov. 22, 2011 for European Patent Application No. 07756264.3-1261, filed on Nov. 18, 2008.

* cited by examiner

BOTTLE MIXING ASSEMBLY

FIELD OF THE INVENTION

The present invention is directed to a method and apparatus for sealingly coupling two containers, each holding a different material, to enable the mixture of the different materials.

BACKGROUND OF THE INVENTION

Description of Prior Art and Related Information

Frequently, materials that are to be placed in use, must be compounded or mixed just prior to use because one or both materials are not stable, must be maintained in a sterile environment, are reactive with air and/or water, or the like. Such materials include pharmaceuticals, such as insulin, food products, such as chocolate flavored milk powder, chemical compositions, such as silver salt, hydride salts, and the like, hair dyes, epoxy cements, and the like. These are frequently referred to as two-component compositions. Frequently, one component must be maintained in the sealed state for stability, sterility, or the like. The other component frequently is stable and can be a solvent, such as water, or alcohol, propylene glycol, milk, and the like.

Traditionally, two-component compositions are furnished in two separate containers. One or both of the containers may be sealed to maintain its respective contents in a sealed environment. To mix the composition, each sealed container is broken open and its contents are mixed with the other component.

This has never been an ideal situation. One major drawback in this conventional approach consists of the probability of spills. If one of the materials is caustic, or flammable, or extremely reactive, a spill can lead to fire, or the like. If the two components must be mixed in stoichio metric amounts, the loss of a portion of one component can prevent successful mixing and preparation of the desired two-component composition. This is especially true for chemical compositions and a number of pharmaceutical compositions. The transfer of one component to another component also raises the problem of sterility. The air has literally millions of microbes per cubic centimeter. When one component is passed into the container for the other component, or a third container, microbes are carried along into the mixture, contaminating the composition. If either of the components are reactive or sensitive to oxygen, carbon dioxide, water vapor, or air, the mixing has an inherent disadvantage of exposing the component to such materials when blending the two components together.

There is a need for a sealed container which can be opened without exposure to the general environment to permit the mixing of two components together between the sealed container and the second container without exposing the component in the sealed container to the outside environment.

SUMMARY OF THE INVENTION

The present invention provides structures and methods which overcome the deficiencies in the prior art.

In one aspect, a coupling assembly is provided. The coupling assembly comprises a coupler, an internally and externally threaded insert, and a temporary seal coupled to the coupler. Thus, the temporary seal may be integral with the coupler or connected to the coupler as a separate part. The coupler has a first end, a first threaded portion configured to mate with a first bottle, a second threaded portion and a second end. The insert has an outer threaded insert portion configured to mate with the second threaded portion of the coupler and an inner threaded insert portion configured to mate with a second bottle.

The assembly further comprises a locking mechanism to prevent the coupler and the insert from disconnecting once the seal is sufficiently breached. The locking mechanism comprises an internal ratchet formed on the coupler, and a corresponding external ratchet formed on the insert and configured to mate and lock with the internal ratchet. The inner threaded insert portion comprises a first set of threads configured to mate with a first bottle spout and a second set of threads configured to mate with a second bottle spout. The inner threaded insert portion further comprises a third set of threads configured to mate with a third bottle spout. The insert is configured to be rotated with respect to the coupler after securely receiving the second bottle. The inner threaded insert portion comprises an axial length in the range of 3 mm to 20 mm. Preferably, no portion, or section, of the seal is dislodged once breached. Instead, breached portions of the seal remain tethered to the coupler and remain in an open configuration to enable contents to freely mix and flow. The assembly further comprises a tubular seal formed between the insert and the second bottle and a sealing relationship formed between the coupler and the insert.

In another aspect, a coupling assembly comprises a coupler having a first end, a first threaded portion configured to mate with a first bottle, a second threaded portion and a second end. A temporary seal temporarily blocks fluid communication between the first end of the coupler and the second coupler. An internally and externally threaded insert has an outer threaded insert portion configured to mate with the second threaded portion of the coupler and an inner threaded insert portion configured to mate with a second bottle. The insert is configured to securely mate with the second bottle before breaching the temporary seal.

The assembly may further comprise a tubular seal to prevent leakage between the insert and the bottle coupled to the insert.

The inner threaded insert portion comprises a first set of threads configured to mate with a first bottle spout, and a second set of threads configured to mate with a second bottle spout. The inner threaded insert portion further comprises a third set of threads configured to mate with a third bottle spout. The insert is configured to be screwed into the coupler after securely receiving the second bottle. The inner threaded insert portion comprises an axial length in the range of 3 mm to 20 mm. Preferably, no portion of the seal is dislodged once breached.

In a further aspect, a method of coupling containers is provided. The method comprises connecting a first container containing mix ingredients to a coupler, temporarily sealing the mix ingredients with a seal, screwing a bottle into an insert, and screwing the bottle and the insert together into the coupler to breach the seal. The method further comprises preventing leakage between the bottle and the insert. The step of preventing leakage between the bottle and the insert comprises forming a seal between a spout of the bottle and an internal stop within the insert. The step of preventing leakage between the bottle and the insert comprises disposing a tubular seal between the insert and the bottle. The method further comprises preventing leakage between the coupler and the insert. The method further comprises forming the insert with at least two sets of internal threads for mating with two different bottle spouts.

In a further aspect, a mixing assembly comprises a coupler with a temporary seal that is connected to a first container containing mix ingredients. An insert, threaded externally and internally, is threadedly mated with the internally threaded coupler in an initial position short of breaching the temporary seal. A second container is screwed into the internally threaded insert. Sealing relationships are formed between the coupler and the insert, and between the insert and the received second container. Once the second container is secured to the insert, the coupler is screwed downwardly toward the insert to cause the insert to threadedly advance toward and eventually breach the temporary seal to enable contents of the first container to mix with that of the second container.

DETAILED DESCRIPTION OF THE PREFERRED EMBODIMENTS

Figure 1:
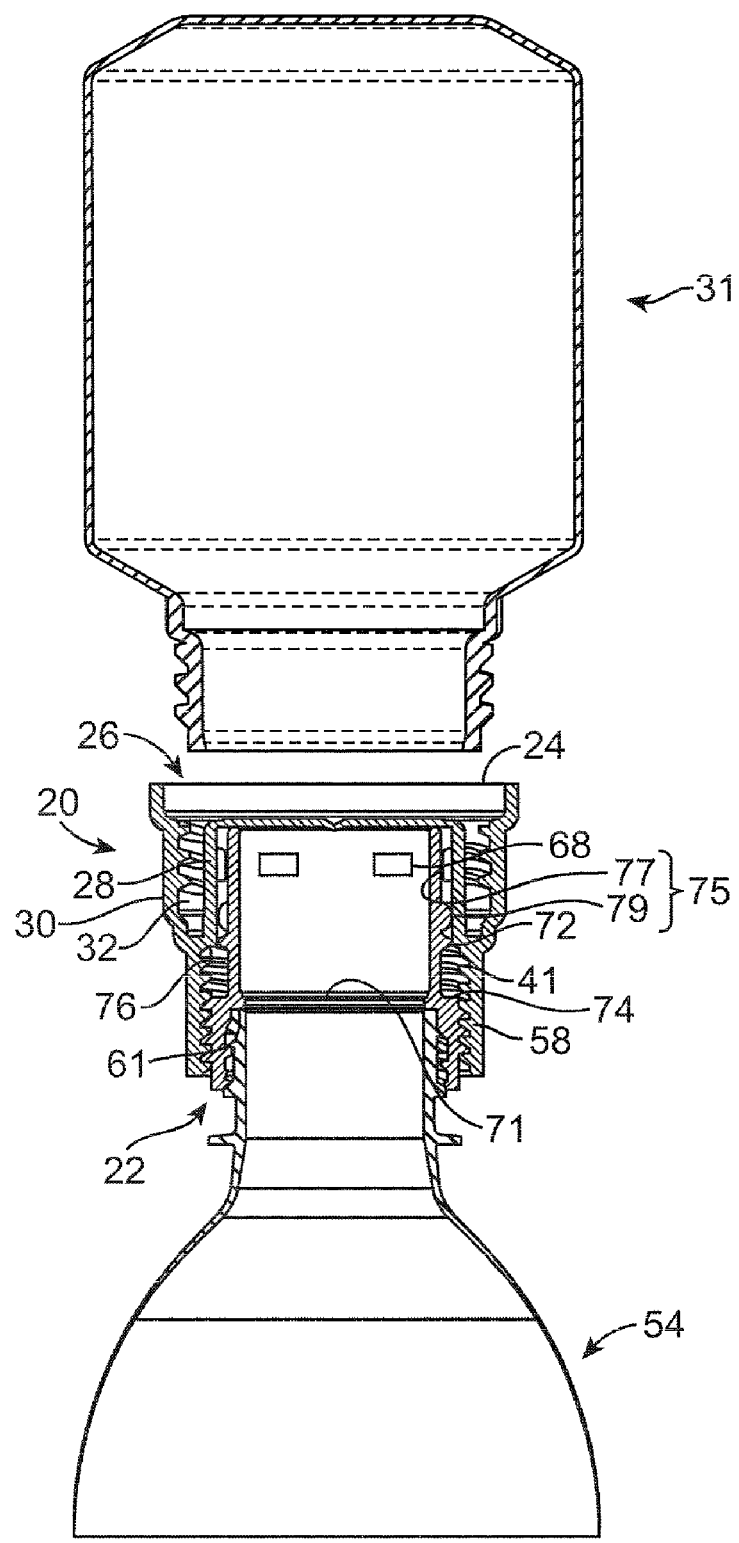
FIG. 1 is an axial cross-sectional view of a first preferred embodiment of a bottle mixing assembly with a temporary seal intact.
Figure 2:
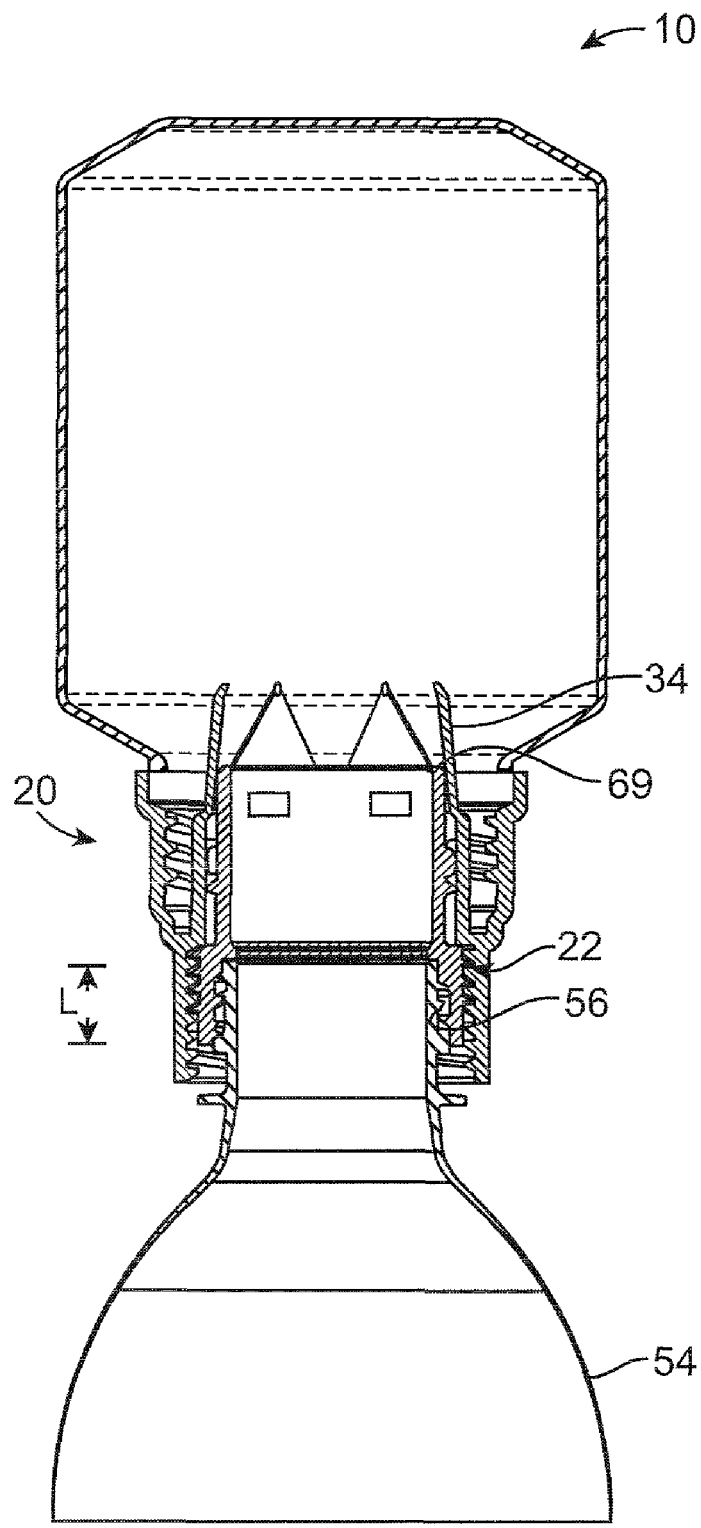
FIG. 2 is an axial cross-sectional view of the first preferred embodiment of the bottle mixing assembly with the temporary seal breached.

A first preferred embodiment of a mixing assembly is illustrated in FIGS. 1 and 2, and designated generally by the reference numeral 10. The assembly 10 comprises a coupler 20 and a threaded insert 22 which is externally threaded to mate with the coupler and internally threaded to receive a threaded spout of a container, such as a water bottle. The threaded insert 22 may comprise a generally tubular structure.

It is to be expressly understood that directional terms such as "upward," "downward," "upper," "lower" and the like are used herein in reference to the orientation of the structures as shown in the Figures, and are not meant to limit the position, motion or operation of the preferred embodiments since the entire assembly may originally be in any orientation (e.g., sideways, upside down, etc.).

Figure 3:
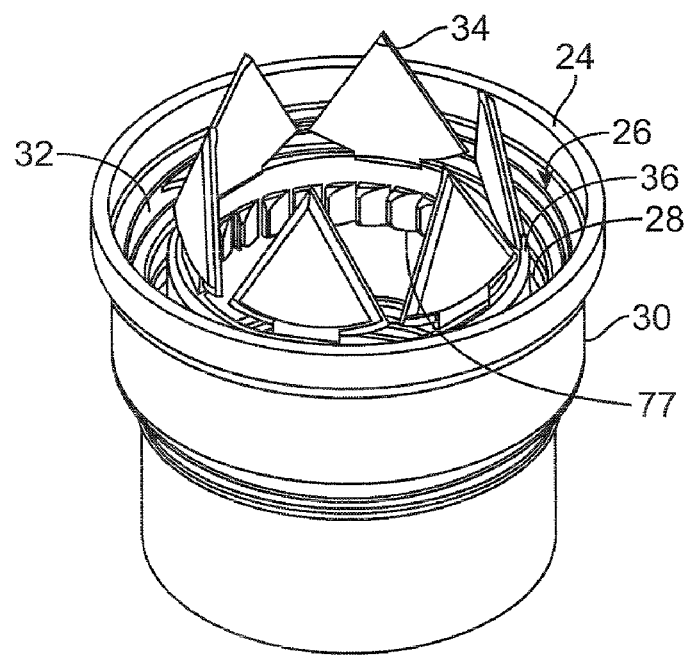
FIG. 3 is a top perspective view of a preferred coupler.

FIG. 3 is a top perspective of the preferred coupler 20 with a temporary seal 34 shown breached for clarity. In FIG. 3, the coupler 20 comprises a first end 24 and a first opening 26 defined by a concentric pair of cylindrical walls 28, 30. The concentric cylindrical walls 28, 30 make at least a portion of the first opening 26 annular. A first internally threaded portion 32 is formed on the outer cylindrical wall 30 and is configured to mate with an externally threaded spout of a first container 31. The temporary seal 34 preferably comprising a seal membrane is coupled to the coupler 20, preferably adjacent to the first end 24, preferably formed integrally with the coupler 20. In the preferred embodiment, the temporary seal 34 covers a top, or first, end 36 of the inner cylindrical wall 28 and remains tethered to the inner wall even after being breached. The temporary seal 34 is coupled to the coupler 20. In the preferred embodiment, the temporary seal 34 may be integral with coupler 20 or attached to the coupler 20 as a separate piece.

Figure 4:
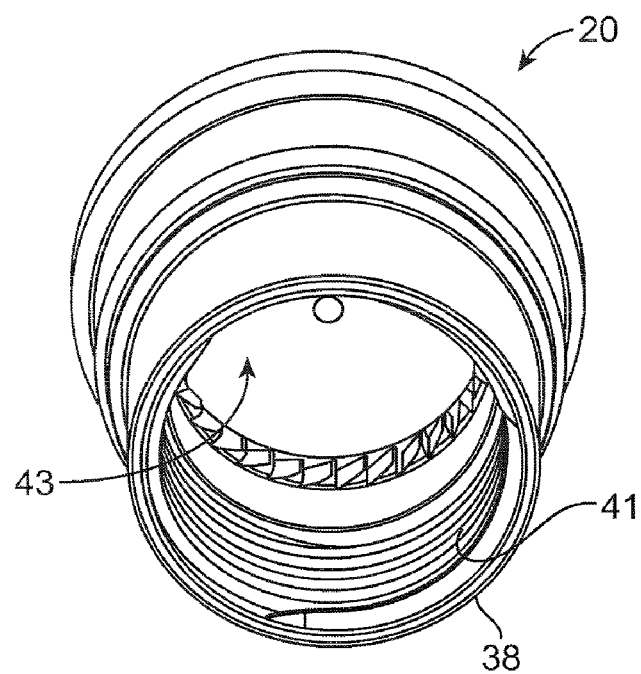
FIG. 4 is a bottom perspective view of the preferred coupler.

In FIG. 4, the coupler 20 also comprises a second end 38, a second internally threaded portion 41 and a second opening 43 that is temporarily blocked from fluid communication with the first opening 26 by the temporary seal 34. The second internally threaded portion 41 is configured to receive and mate with the insert 22 as shown in FIG. 5.

Figure 5:
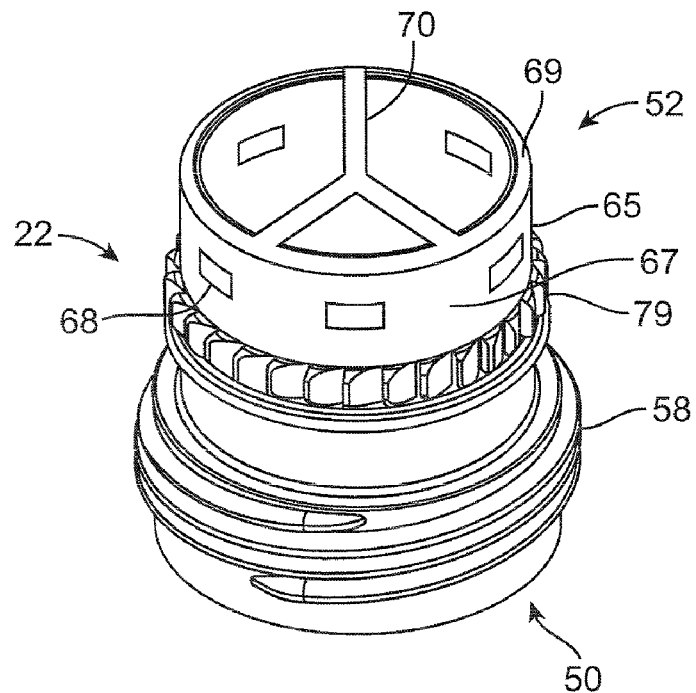
FIG. 5 is a top perspective view of a preferred internally and externally threaded insert.
Figure 6:
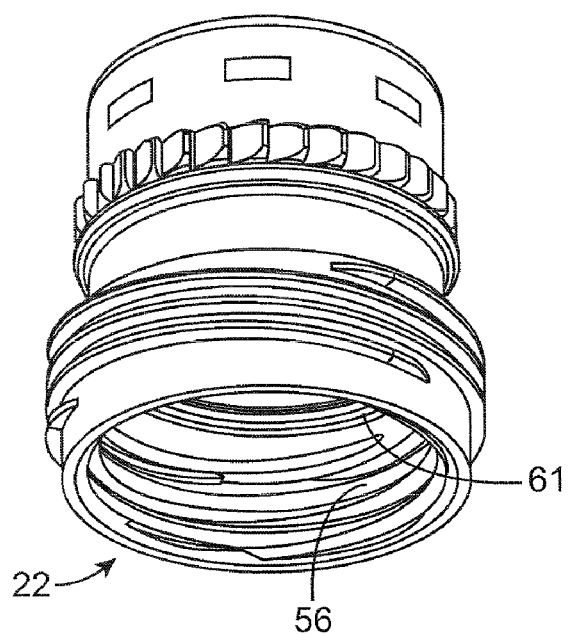
FIG. 6 is a bottom perspective view of the preferred insert.

In FIG. 5, the internally and externally threaded insert 22 is preferably cylindrical and may be shaped as a sleeve. The insert 22 comprises a lower, proximal portion 50 and an upper, distal portion 52. The proximal portion 50 is configured to receive a threaded spout of a container 54, such as a water bottle, shown in FIG. 1. Accordingly, the proximal portion 50 comprises an internally threaded portion 56, as shown in FIG. 6. The internally threaded portion 56 preferably comprises two or three sets of different threads to accommodate the differently threaded bottle spouts, although it is to be expressly understood that more sets of threads may be included.

In FIGS. 1 and 5, the proximal portion 50 also comprises an externally threaded portion 58 configured to mate with the second internally threaded portion 41 of the coupler 20, as shown in FIG. 1. In FIGS. 1 and 6, an internal circular stop, or ledge, 61 prevents the second bottle 54 from being screwed into the insert 22 beyond a certain, predetermined point.

The distal portion 52 of the insert 22 is configured to breach the temporary seal 34 when the coupler 20 is rotated with respect to the insert 22, or when the insert 22 is rotated with respect to the coupler 20. The distal portion 52 comprises a cylindrical wall 65 with generally smooth or unthreaded outer surface 67. Drain holes 68 are defined in the wall 65 to facilitate fluid communication once the temporary seal 34 is breached. A distal or breaching end 69 is preferably annular and configured to abut and breach the temporary seal 34. A guard 70 preferably comprising permanent spokes is located adjacent to the breaching 69 to prevent a user from sticking a finger therethrough and getting stuck and possibly cut by the pie-shaped sections of a breached seal.

Referring back to FIGS. 1 and 2, the operation of the preferred embodiment 10 of the assembly will be described. In the preferred embodiment, the assembly 10 will be pre-assembled with the first container 31 containing mix ingredients fully screwed into the coupler. In the preferred embodiment, the insert 22 is partially screwed into the coupler 20. To minimize confusion to the user, the insert 22 may come pre-assembled with its lower proximal portion 50 protruding out beyond the second end 38 of the coupler 20 to indicate to the user that the second container 54, such as a water bottle, should be screwed into the insert 22.

The second container 54 is screwed into the insert 22 to form a secure fit, such as when a distal end 71 of the second container 54 abuts the internal stop 61 and forms a seal with the insert 22. Once the second container 54 is sufficiently screwed into the insert 22 to form a secure fit, then the second container 54 and the insert 22 move in unison as a single unit to screw into the coupler 20 to breach the temporary seal 34. In the preferred embodiment, no portion or section of breached seal 34 is dislodged or mixed in with the contents. Instead, breached portions of the temporary seal 34 remain connected, e.g., tethered, to the coupler 20.

In the preferred embodiment, the insert 22 is not advanced toward the temporary seal 34—e.g., the coupler 20 being screwed downward onto the insert 22 or the insert 22 being screwed into the coupler 20—until the insert 22 has first securely received the second container 54. This initial securing of the second container 54 to the insert 22 prior to breaching the temporary seal 34 prevents any leakage of contents from the first container 31 once the temporary seal 34 is breached.

The temporary seal 34 thus temporarily prevents fluid communication between the coupler 20 and the insert 22, thereby segregating contents in the first bottle 31 (e.g., dry mix ingredients such as powder) from contents held in the second bottle 54 (e.g., water) until the temporary seal 34 is breached. Alternatively stated, the temporary seal 34 temporarily blocks fluid communication between whatever is connected to the coupler 20 on one side of the seal 34 and whatever is connected to the insert 22 on an opposite side of the seal 34.

In FIG. 1, a locking mechanism 75 locks the coupler 20 and insert 22 to each other to prevent either member 20, 22 from being disconnected (e.g., twisted off) once the temporary seal 34 is sufficiently breached. In the preferred embodiment, the locking mechanism 75 comprises an internal ratchet 77 formed on the coupler 20 beneath the temporary seal 34 and a corresponding external ratchet 79 formed on the cylindrical wall 65 of the insert 22 configured to mate and lock with the internal ratchet 77. The positions of the external ratchet 79 on the insert 22 (i.e., a predetermined distance beneath the breaching end 69 in FIG. 5) and the internal ratchet 77 on the coupler (i.e., beneath the temporary seal 34 in FIG. 3) are configured such that the ratchets 77, 79 will engage and lock after the insert 22 has sufficiently penetrated through the temporary horizontal plane of the temporary seal 34 and breached said seal 34.

A sealing relationship is formed between the coupler 20 and the insert 22 to prevent leakage therebetween. In the preferred embodiment, the sealing relationship may comprise an annular ridge 72 formed on the external surface 67 of the insert distal portion 63 and be configured to form a seal with the inner surface of the coupler inner cylindrical wall 28. Alternatively, a ridge may be formed on the inner surface of the inner cylindrical wall 28 that forms a sealing relationship with the distal portion 52 of the insert 22.

In a preferred method of breaching the temporary seal 34 as shown in FIG. 2, the coupler 20 is screwed downwardly toward the secured second bottle 54, thereby causing the insert 22 to be screwed toward the temporary seal 34 so as to breach the seal 34. Of course, the coupler 20 may alternatively be held stationary while the insert 22 in conjunction with the second bottle 54 is screwed upward toward the temporary seal 34. A second sealing relationship between the coupler 20 and the insert 22 may be formed by an annular shoulder 74 of the insert 22 that abuts and forms a seal with a bottom facing coupler shoulder 76 formed at the base of the inner cylindrical wall 28. This second sealing relationship between the coupler 20 and the insert 22 further helps to prevent leakage.

A sealing relationship is also formed between the insert 22 and the second bottle 54. In the first preferred embodiment, this seal is when the bottle 54 is fully screwed into the insert 22 and the top end of the spout abuts the internal stop 61. Thus, in the first preferred embodiment, the insert 22 is configured to form two seals: a first seal with the coupler 20 into which the insert 22 is screwed, and a second seal with the second bottle 54 received by the insert 22.

Figure 7:
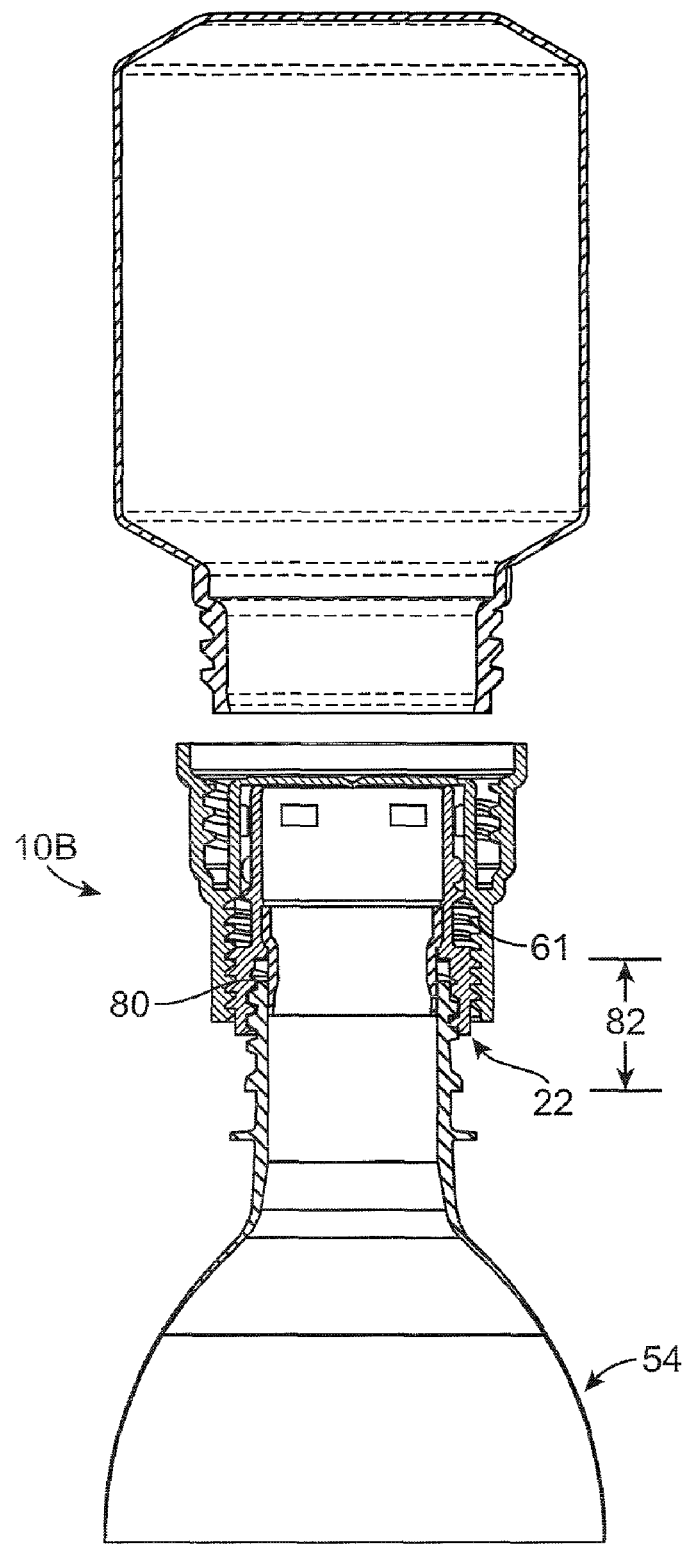
FIG. 7 is an axial cross-sectional view of a second preferred embodiment of a bottle mixing assembly including a tubular seal.

In a second embodiment 10B shown in FIG. 7, an optional tubular seal 80 may be employed to further prevent any leakage between the insert 22 and the second bottle 54. Such a tubular seal 80 may be particularly useful when, for example, the length of the spout 82 of the second bottle 54 is short and unable to reach the internal stop 61 when fully screwed into the insert 22.

Figure 8:
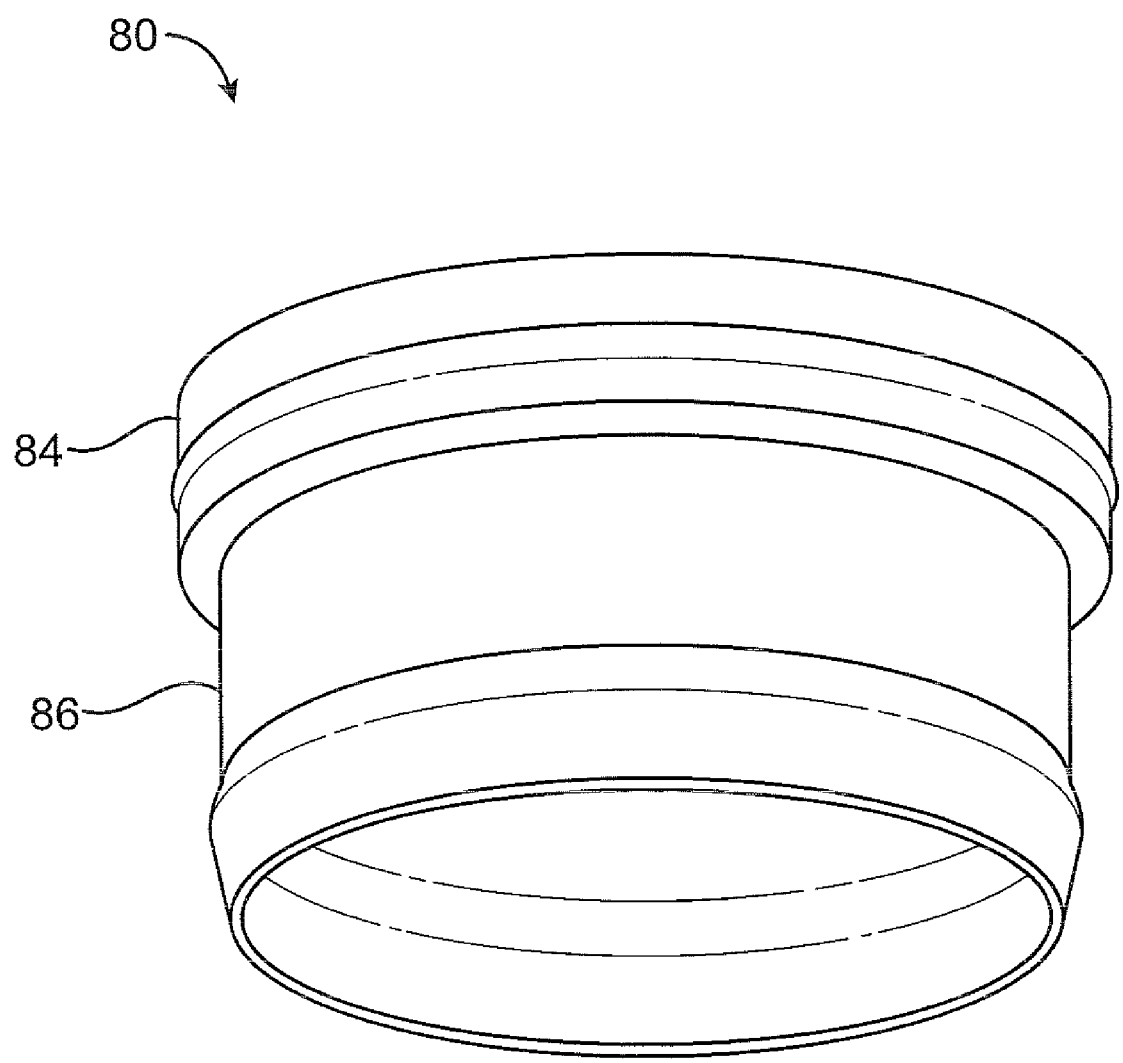
FIG. 8 is a perspective view of the preferred tubular seal.

FIG. 8 is a perspective view of the preferred tubular seal 80. The tubular seal 80 includes a wider annular top portion 84 configured to form a seal with the inner surface of an insert 22 (shown in FIG. 7), and a narrower cylindrical body 86 configured to form a seal with the inner surface of a bottle spout (also shown in FIG. 7).

In the preferred embodiments, it will be appreciated that the preferred insert 22 increases flexibility by accommodating a variety of differently threaded bottles. By forming the internally threaded portion 56 with dual or triple threads for any particular diameter, the insert 22 can accommodate the standard water bottles used in the U.S. and most foreign countries.

Furthermore, the internally threaded portion 56 of the insert 22 preferably has an axial length "L" shown in FIG. 2 in the range 3 to 20 mm, with an optimal length around 8 to 12 mm. This length provides more rotational screwing distance for the second bottle 54 to be secured to the assembly 10 before the seal is breached 54, thereby preventing leakage. In other words, the initial securing of the bottle 54 to the insert 22 via screwing preferably does not breach the seal 24.

When the temporary seal 34 is breached as shown in FIG. 2, no portion of the breached seal is dislodged. In particular, each breached seal portion is preferably tethered to the coupler 20 and configured to remain in an open position so as not to block the passageway between the bottles 31, 54. This is particularly useful when the mix contents comprise food and/or drink to be ingested. Keeping the breached seal portions in an open configuration also avoids blockage of contents, particularly dry contents such as powder.

Figure 9:
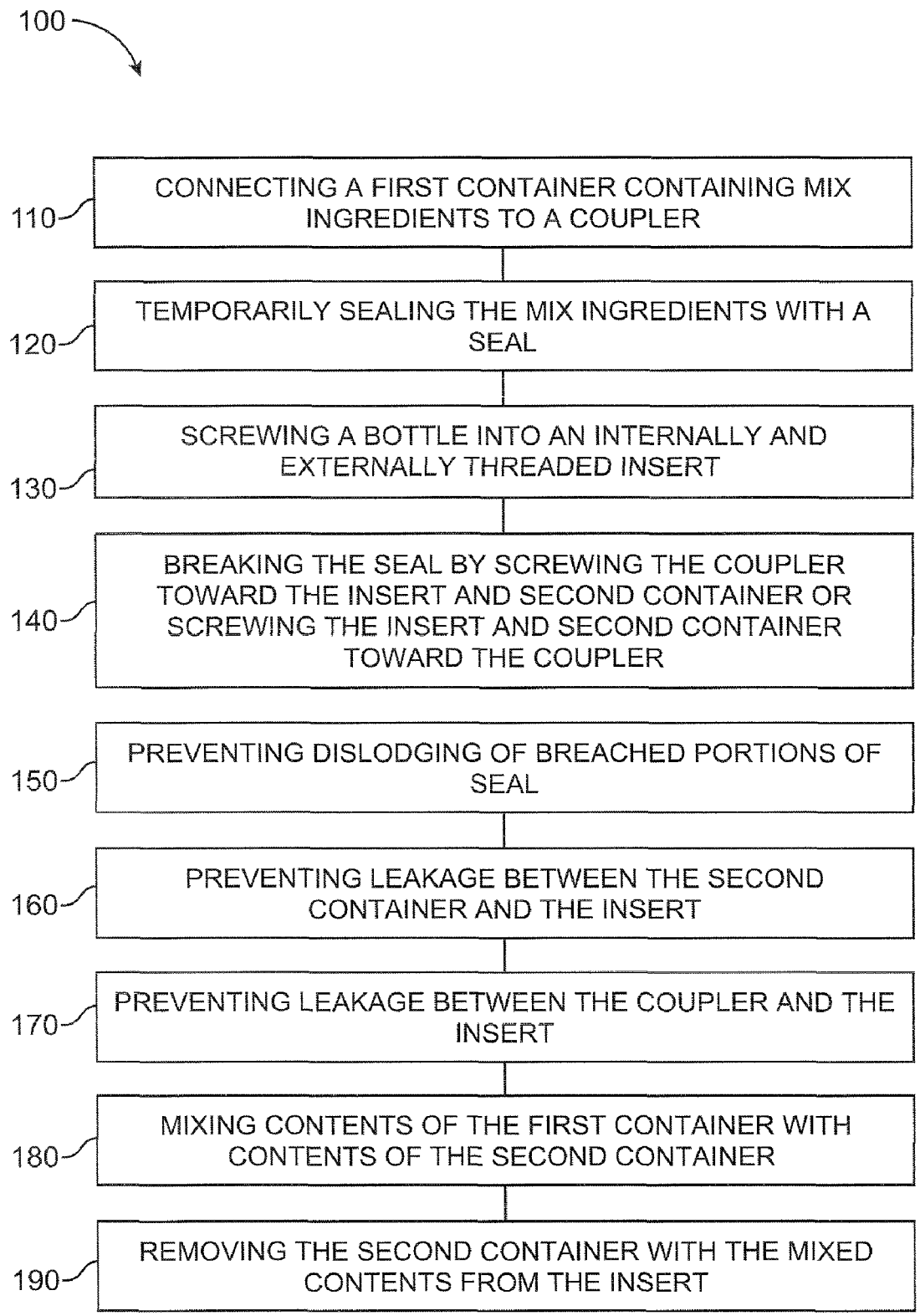
FIG. 9 is a diagram of a preferred method for coupling two container and mixing their respective contents.

In FIG. 9, a preferred method 100 of mixing containers is also provided herein. The method 100 comprises the step 110 of connecting a first container containing mix ingredients to a coupler. The step 110 may comprise screwing the first container into a first internally threaded portion of the coupler. Step 120 comprises temporarily sealing the mix ingredients with a seal. Step 130 comprises screwing a second container bottle into an insert which is preferably already received in the coupler.

Step 140 comprises breaching the seal. This may be accomplished by screwing the coupler toward the insert and secured second container, or by screwing the insert and secured container toward the coupler, or both simultaneously. In either case, the insert is threadedly advanced toward the seal to breach. Step 150 comprises preventing any breached portion of the seal from being dislodged. Step 160 comprises preventing leakage between the second container and the insert by forming a sealing relationship therebetween. Step 170 comprises preventing leakage between the insert and the coupler by forming a sealing relationship therebetween.

In step 180, after the seal is breached, the contents of the first container are mixed with the contents of the second container. Step 190 comprises removing the second container from the insert by unscrewing the second container therefrom. This enables the user to access the mixed contents held in the second container.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what incorporates the essential idea of the invention.

The invention claimed is:

1. A coupling assembly, comprising:
   a coupler having:
      an outer cylindrical wall with a first internally threaded portion configured to mate with a first bottle,
      an inner cylindrical wall concentric within the outer cylindrical wall, the inner and outer cylindrical walls defining a first annular opening,
      a second internally threaded portion adjacent to a second opening opposite the first opening;
   a temporary seal coupled to the inner cylindrical wall of the coupler and configured to temporarily seal contents of the first bottle; and
   a tubular insert having an externally threaded insert portion configured to mate with the second internally threaded portion of the coupler and an internally threaded insert portion configured to mate with a second bottle, the insert being movable with respect to the coupler to breach the seal and open fluid communication between the first bottle and the second bottle.

2. The assembly of claim 1, further comprising a locking mechanism to prevent the coupler and the insert from disconnecting once the seal is sufficiently breached.

3. The assembly of claim 2, wherein the locking mechanism comprises:
   an internal ratchet formed on the coupler; and
   a corresponding external ratchet formed on the insert and configured to mate and lock with the internal ratchet.

4. The assembly of claim 1, wherein the internally threaded insert portion comprises:
   a first set of threads configured to mate with a first bottle spout; and
   a second set of threads configured to mate with a second bottle spout.

5. The assembly of claim 4, wherein the internally threaded insert portion further comprises a third set of threads configured to mate with a third bottle spout.

6. The assembly of claim 1, wherein the insert is configured to be rotated with respect to the coupler after securely receiving the second bottle.

7. The assembly of claim 1, wherein the internally threaded insert portion comprises an axial length in the range of 3 mm to 20 mm.

8. The assembly of claim 1, wherein no portion of the seal is dislodged once breached.

9. The assembly of claim 1, wherein further comprising a sealing relationship formed between the coupler and the insert.

10. A coupling assembly, comprising:
    a coupler having a first annular opening, a first internally threaded portion adjacent to the first opening and configured to mate with a first bottle, a second opening opposite to the first annular opening, and a second internally threaded portion adjacent to the second opening;
    a temporary seal coupled to the coupler adjacent to the first opening, the seal temporarily sealing contents of the first bottle;
    an internally and externally threaded tubular insert having an externally threaded insert portion configured to mate with the second threaded portion of the coupler and an internally threaded insert portion configured to mate with a second bottle; and
    wherein the insert is configured to securely mate with the second bottle and move in unison with the secured second bottle toward the seal to breach the seal.

11. The assembly of claim 10, wherein the internally threaded insert portion comprises:
    a first set of threads configured to mate with a first bottle spout; and
    a second set of threads configured to mate with a second bottle spout.

12. The assembly of claim 11, wherein the internally threaded insert portion further comprises a third set of threads configured to mate with a third bottle spout.

13. The assembly of claim 10, wherein the insert is configured to be screwed into the coupler after securely receiving the second bottle.

14. The assembly of claim 10, wherein the internally threaded insert portion comprises an axial length in the range of 3 mm to 20 mm.

15. The assembly of claim 10, wherein no portion of the seal is dislodged once breached.

16. A coupling assembly, comprising:
    a coupler having:
       an internally threaded outer cylindrical wall adjacent to a first annular opening and configure to mate with a first bottle,
       an inner cylindrical wall concentric within the outer cylindrical wall, and
       a second internally threaded portion adjacent to a second opening opposite the first opening;
    a temporary seal coupled to the inner cylindrical wall of the coupler and configured to temporarily seal contents of the first bottle; and
    a tubular insert having an outer threaded insert portion configured to mate with the second internally threaded portion of the coupler and an inner threaded insert portion configured to mate with a second bottle, the insert comprising a distal end configured to move through the inner cylindrical wall and breach the seal either when the insert is advanced towards the coupler or when the coupler is advanced towards the insert.

17. The assembly of claim 16, wherein the insert comprises:
   a distal portion which includes the distal end; and
   a proximal portion which includes the externally threaded insert portion and internally threaded insert portion.

18. The assembly of claim 16, wherein the temporary seal remains tethered to the coupler after the temporary seal is breached.

19. The assembly of claim 16, wherein the insert is configured to be screwed into the coupler after the second bottle is securely mated with the inner threaded insert portion such that the insert and the second bottle are moved in unison to breach the temporary seal.

20. The assembly of claim 16, wherein the outer cylindrical wall and the concentric inner cylindrical wall form an annular opening configured to receive a spout of the first bottle.

* * * * *